United States Patent
Bailey

(10) Patent No.: US 11,949,719 B2
(45) Date of Patent: *Apr. 2, 2024

(54) SYSTEMS AND METHODS OF INFORMATION SECURITY MONITORING WITH THIRD-PARTY INDICATORS OF COMPROMISE

(71) Applicant: Open Text Holdings, Inc., San Mateo, CA (US)

(72) Inventor: Michael James Bailey, Pasadena, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,520

(22) Filed: Jan. 26, 2022

(65) Prior Publication Data
US 2022/0150282 A1    May 12, 2022

Related U.S. Application Data

(63) Continuation of application No. 16/678,813, filed on Nov. 8, 2019, now Pat. No. 11,245,730.

(51) Int. Cl.
*H04L 9/40* (2022.01)

(52) U.S. Cl.
CPC ............. *H04L 63/20* (2013.01); *H04L 63/14* (2013.01); *H04L 63/145* (2013.01)

(58) Field of Classification Search
None
See application file for complete search history.

(56) References Cited

U.S. PATENT DOCUMENTS

| | | | |
|---|---|---|---|
| 8,239,915 B1 * | 8/2012 | Satish | H04L 63/20 726/1 |
| 9,948,679 B2 * | 4/2018 | Siswick | H04L 63/102 |
| 10,462,173 B1 * | 10/2019 | Aziz | G06F 21/56 |
| 10,922,423 B1 * | 2/2021 | Rungta | G06F 21/577 |
| 11,005,889 B1 * | 5/2021 | Weintraub | H04L 63/20 |
| 11,245,730 B2 * | 2/2022 | Bailey | H04L 63/1441 |
| 2006/0053169 A1 * | 3/2006 | Straub | G06F 16/951 |
| 2010/0125450 A1 * | 5/2010 | Michaelangelo | G06F 40/226 704/9 |

(Continued)

*Primary Examiner* — Kaveh Abrishamkar
(74) *Attorney, Agent, or Firm* — SPRINKLE IP LAW GROUP

(57) ABSTRACT

An information security monitoring system can import indicators of compromise (IOC) definitions in disparate formats from third-party source systems, convert them into editable security definitions in an internal system format, and provide a user interface for composing or editing these security definitions with enhancements, including complex security definitions such as those having a nested Boolean structure and/or those that reference one or more security definitions, a behavioral rule, and/or a vulnerability description. One or more whitelists can be added to handle exceptions. Each composed or modified security definition is then compiled into an executable rule. The executable rule, when evaluated, produces a result indicative of an endpoint security action needed in view of an endpoint event that meets the composed or modified security definition.

20 Claims, 10 Drawing Sheets

(56) References Cited

U.S. PATENT DOCUMENTS

| | | | | |
|---|---|---|---|---|
| 2014/0108665 | A1* | 4/2014 | Arora | H04L 65/1069 |
| | | | | 709/227 |
| 2015/0324547 | A1* | 11/2015 | Graham | G16H 70/40 |
| | | | | 705/2 |
| 2017/0004424 | A1* | 1/2017 | Chapman | G06Q 10/10 |
| 2017/0142144 | A1* | 5/2017 | Weinberger | G06F 21/552 |
| 2017/0353459 | A1* | 12/2017 | Lawrence | H04L 63/10 |
| 2018/0351818 | A1* | 12/2018 | Mohanram | H04L 63/0263 |
| 2019/0392140 | A1* | 12/2019 | Kawakita | G06F 21/552 |
| 2019/0394225 | A1* | 12/2019 | Vajipayajula | G06F 16/212 |
| 2020/0314145 | A1* | 10/2020 | Bolignano | G06Q 10/103 |

* cited by examiner

```
rule foobar_downloader {
strings:
        $b2="Can't find Payload( ) address" ascii wide
        $b3="/SilverAppl;component/App.xam1" ascii wide
        $b4="Can't allocate ums after buf[ ]" ascii wide
        $b5="------------ START ------------"
condition:
        ( (2 of ($b*)) )
}
```

FIG. 4A

```
rule foobar_shellext {
strings:
        $b2="Exfil payload" ascii wide
        $b3="stealing ur data!" ascii wide
        $b4="scanning for credit cards" ascii wide
        $b5="------------ START ------------"
condition:
        ( (2 of ($b*)) )
}
```

```
[
file.hashes.md5 = '985FF936CC2313CFA5547576627A2F1C' OR
file.hashes.md5 = '40F5F347DEB70606027E4C8A14E2826E' OR
file.hashes.md5 = '8D57CEFA205EDCCB286BAEDFB62EE9F0' OR
file.hashes.'sha-1' = 'B08087898683B24536DB472EDF7CB09F9A9F464B' OR
file.hashes.'sha-1' = '808B5C85FA994DDAAF779ECD4CC035DDF0173EF6' OR
file.hashes.'sha-1' = 'AF2A6A20226DFF49B1E8430D248C10DDA4EF26CD' OR
domain-name.value = 'evil.ec2.cloudcompany.com' OR
ipv4-addr.value = '12.7.83.2'
]
```

- OR
  - File/Hashes/MD5 *equals* 985FF936CC2313CFA5547576627A2F1C
  - File/Hashes/MD5 *equals* 40F5F347DEB70606027E4C8A14E2826E
  - File/Hashes/MD5 *equals* 8D57CEFA205EDCCB286BAEDFB62EE9F0
  - File/Hashes/SHA-1 *equals* B08087898683B24536DB472EDF7CB09F9A9F464B
  - File/Hashes/SHA-1 *equals* 808B5C85FA994DDAAF779ECD4CC035DDF0173EF6
  - File/Hashes/SHA-1 *equals* AF2A6A20226DFF49B1E8430D248C10DDA4EF26CD
  - Domain/Value *equals* evil.ec2.cloudcompany.com
  - IPv4/Value *equals* 12.7.83.2

SYSTEMS AND METHODS OF INFORMATION SECURITY MONITORING WITH THIRD-PARTY INDICATORS OF COMPROMISE

CROSS-REFERENCE TO RELATED APPLICATIONS

This application is a continuation of, and claims a benefit of priority under 35 U.S.C. § 120 from, U.S. patent application Ser. No. 16/678,813, filed Nov. 8, 2019, now U.S. Pat. No. 11,245,730, entitled "SYSTEMS AND METHODS OF INFORMATION SECURITY MONITORING WITH THIRD-PARTY INDICATORS OF COMPROMISE," which is fully incorporated by reference herein for all purposes.

TECHNICAL FIELD

This disclosure relates generally to information security. More particularly, this disclosure relates to systems, methods, and computer program products for information security monitoring with disparate third-party indicators of compromise.

BACKGROUND OF THE RELATED ART

Indicators of compromise (IOCs) refer to artifacts or pieces of data that can serve as forensic evidence of unusual, and potentially malicious, activities on a computer system or network, for instance, an unauthorized intrusion to a computer's operating system, a cyberattack against a computer network, etc. IOCs can be found in system log entries or files and typically include virus signatures, Internet Protocol (IP) addresses, Universal Resource Locators (URLs) or domain names of known attackers (e.g., sources from where distributed denial-of-service (DDoS) attacks are originated, from where a malware is originated, etc.), hashes of malware files, and so on.

By finding and analyzing IOCs in system log entries or files, it is possible to detect a potential or in-progress attack that may lead to a security breach or compromise in a computer system or network. However, IOCs are not easily detectable, particularly those of incredibly complex malicious code designed to attack computer networks through their connections to the Internet.

To this end, entities such as enterprises, government agencies, organizations, and so on may install agents or sensors on endpoints of their respective networks to collect and send behavioral data to a central database for analysis and possible remediation by an intrusion detection system, antivirus software, a network security analyst, an information technology (IT) professional, or the like. This is referred to as endpoint detection and response (EDR).

An endpoint refers to a remote computing device that communicates with a computer network with which it is connected. Examples of endpoints can include desktop computers, laptop computers, smartphones, tablet computers, servers, workstations, and so on. These remote computing devices represent vulnerable points of entry into their respective computer networks as they are where attackers execute code and exploit network vulnerabilities and where digital assets are encrypted, exfiltrated, or otherwise leveraged.

EDR solutions are designed to continuously monitor endpoints and respond to threats from the Internet. Once the behavioral data sent by the agents and/or sensors is stored in the central database, an EDR system can run analytics on the behavioral data, identify patterns in the behavioral data, detect anomalies in the patterns, and send alerts for remedial action or further investigation.

SUMMARY OF THE DISCLOSURE

An object of the invention is to provide an information security monitoring system that can monitor, analyze, and/or investigate IOCs from disparate sources (e.g., third-party systems that operate external to and independently of the information security monitoring system). Generally, the information security monitoring system has network-enabled digital forensic tools that can be used for forensic, investigative, and security purposes, such as scanning, documenting, and remediation. With these tools, users (e.g., investigators) of the information security monitoring system can expedite and shorten the response time from a cyberattack or security incident.

In information security, there are three high level types of definitions: IOC definitions, standard formats for expressing vulnerabilities, and formats for defining behavioral rules. These are collectively referred to as security definitions. In some embodiments, the information security monitoring system may implement a method comprising importing security definitions in disparate formats from a plurality of source systems. In some embodiments, the security definitions in the disparate formats can comprise at least two of an endpoint behavioral rule in the JavaScript Object Notation (JSON) format, an IOC definition in the JSON format, an IOC definition in the eXtensible Markup Language (XML) format, an IOC definition in a language and serialization format, a rule consisting of sets of strings and a Boolean expression, or a vulnerability description in the XML format.

The method may further comprise converting the security definitions in the disparate formats into editable security definitions in a system format internal to the information security monitoring system, providing the editable security definitions to a user device for rule building/composition, receiving or retrieving a composed or modified security definition in the system format from the user device, and compiling the composed or modified security definition in the system format into an executable rule. The executable rule can be evaluated (e.g., by the information security monitoring system, by an endpoint, by an EDR system, etc.) to produce a result indicative of an endpoint security action needed, for instance, collecting a file, killing a process, deleting a file, uploading a file to a sandbox, etc.

In some embodiments, the security definitions in the disparate formats can be converted by parsing the security definitions in the disparate formats from the plurality of source systems to extract metadata fields and operators and mapping the metadata fields thus extracted to metadata fields of the editable security definitions in the system format in accordance with a master metadata schema. In some embodiments, the master metadata schema is based on a superset of STIX™ 2.

In some embodiments, the composed or modified security definition in the system format can have a nested Boolean structure and/or can reference another security definition, a behavioral rule, or a vulnerability description. In some embodiments, the system format is the JavaScript Object Notation (JSON) format.

In some embodiments, the editable security definitions can be composed or modified on the user device through a user interface (UI). As a non-limiting example, the UI can be a user-friendly graphical UI (GUI). In some embodiments, the user device can be an endpoint of an enterprise network. In some embodiments, composed or modified security definitions in the system format are stored in a database. In some embodiments, whitelists can also be created, composed, or modified through the UI.

In some embodiments, the information security monitoring system communicates the executable rule to an agent running on an endpoint of an enterprise network. The agent sends a notification to the information security monitoring system in response to the endpoint having telemetry (which refers to a collection of measurements or other data at the endpoint that is remote from the information security monitoring system) meeting the executable rule. In response to the notification from the agent, the information security monitoring system can retrieve the telemetry from the endpoint and store the telemetry in a database.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 4A-4B show examples of IOC definitions describing malware signatures in the YARA language.

FIGS. 5A-5B are examples how IOCs in disparate formats can be converted into an editable system format according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
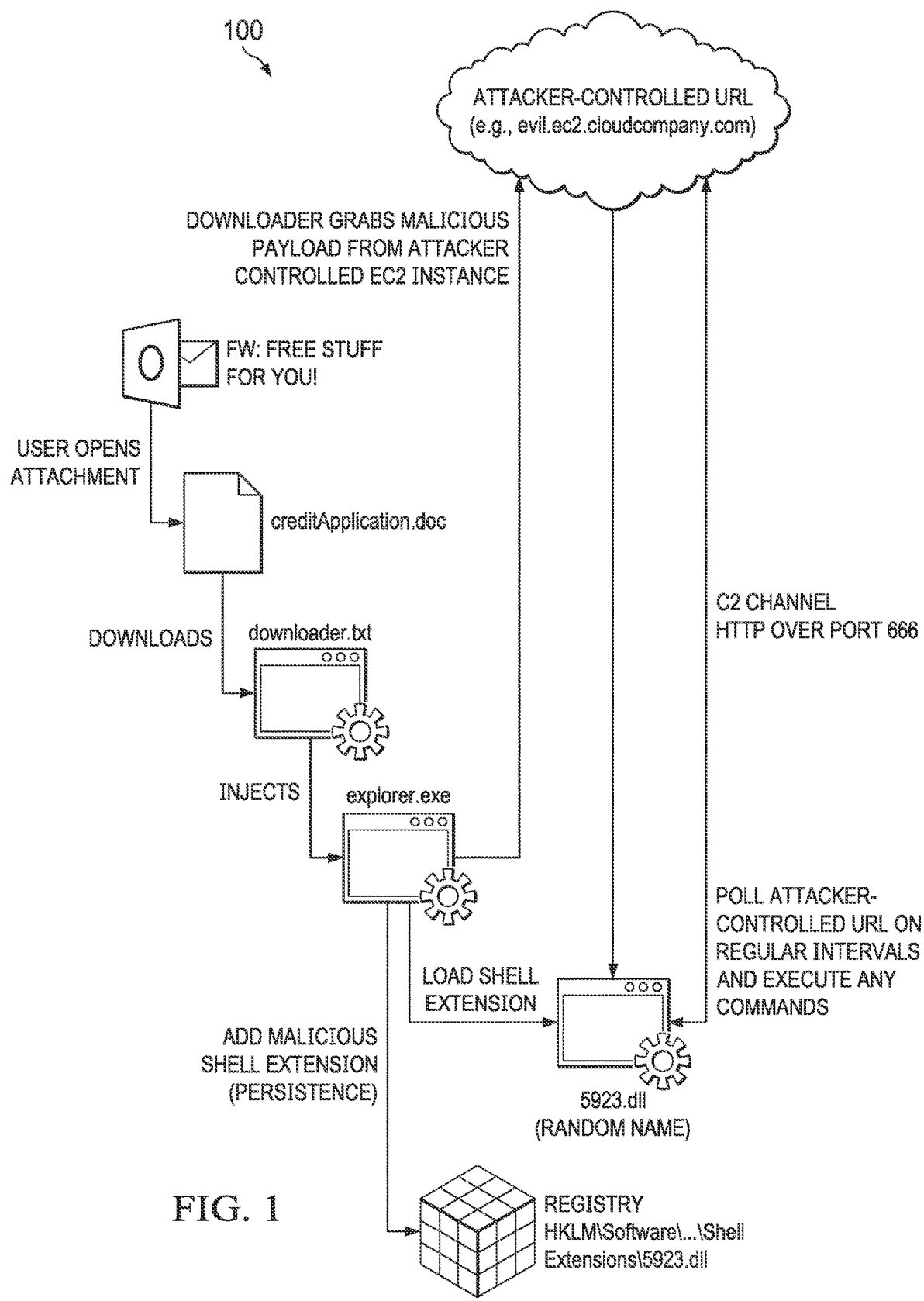
FIG. 1 is a diagram showing an example of an attack flow.

As discussed above, an object of the invention is to provide an information security monitoring system that can monitor, analyze, and/or investigate IOCs. FIG. 1 illustrates an example of how IOCs can be collected in an attack flow 100.

In the example of FIG. 1, a user of a computing device (e.g., an endpoint of an enterprise network) opens a phishing email with a "creditApplication" document. When the user opens the document through an application running on the endpoint, the user is asked to enable macros embedded in the document. Typically, such macros, which can be written in the programming language of Visual Basic for Applications (VBA), are used to automate tasks in the application.

However, in this case, an attacker has written a VBA macro that will drop an executable file onto whatever the device the user is using when the user opens the document on the device. Thus, when the user is tricked to enable the VBA macro in order to open the document, the VBA macro drops an executable file called "downloader.txt" and injects downloader.txt into a file manager application called "explorer.exe" on the endpoint. In this case, the file manager application (e.g., a file explorer, WINDOWS Shell, WINDOWS Explorer, explorer.exe, etc.) provides a graphical user interface (e.g., desktop, folder, taskbar, start menu, etc.) for accessing the file system on the device the user is using.

The file downloaded by the VBA macro is actually a downloader in a portable executable file format. In this example, the original file name would have been downloader.dll (dynamic link library), but the VBA macro saves it to a file called "downloader.txt instead." This is done so that the downloaded file looks like a text file, in an effort to evade defenses. When the VBA macro runs, it "injects" downloader.txt into the file manager application, forcing it to load the executable file "downloader.txt" and connect to a URL "evil.ec2.cloudcompany.com" as instructed by the executable file. The URL "evil.ec2.cloudcompany.com" is controlled by the attacker from where the phishing email is originated.

The executable file "downloader.txt" causes the file manager application to download a malicious payload from the attacker-controlled URL. The malicious payload, in turn, downloads a malicious shell extension called "5923.d11". To avoid detection, this malicious shell extension has a random name. The file manager application supports shell extensions which allow third-party applications to extend the functionality of the shell. Thus, generally, the file manager application automatically loads a downloaded shell extension based on information in a registry (e.g., WINDOWS Registry such as "HKLM\Software\ . . . \Shell Extensions" shown in FIG. 1).

Unable to recognize the malicious payload as a threat, the file manager application automatically loads the downloaded shell extension and installs the malicious shell extension "5923.d11". The malicious shell extension "5923.d11" is "installed" as a shell extension when downloader.txt, executing inside the file manager application, added it to the registry. This ensures that the malware will be loaded automatically (by the file manager application in this example) and establishes persistence, even if the user restarts their machine. The malicious shell extension contains code that will poll or beacon out, at regular intervals, to the attacker-controlled URL for instructions and execute any commands from the attacker-controlled URL.

In the above example, the attacker-controlled URL is an example of an IOC. Such an IOC can be logged in a system log that documents network connection requests made by the file manager application running on the endpoint.

Table 1 below lists examples of basic IOC atoms that may be found from attack flow 100.

| What | Details | Comments |
|---|---|---|
| User opens macro enabled word doc attachment | excel.exe creates winword.exe; winword.exe opens a doc file which has embedded macros | unusual; might be normal for this company |
| VBA macro drops downloader.txt | winword.exe creates a txt file that is really a DLL and not a txt file | suspicious |
| VBA macro uses remote dll injection into the shell | winword.exe creates a remote thread inside explorer.exe | suspicious |
| Shell loads a down loader.txt | explorer.exe loads a dll which, has a txt extension | suspicious |
| Shell downloads 5923.dll from a website | explorer.exe connects to evil.ec2.cloudcompany.com:666; downloads a dll file to temp | a little unusual, but not necessarily suspicious |
| Shell installs new shell extension | explorer.exe creates registry keys to represent new shell extension | unusual; might be okay for this company |

The tables above illustrate by example the type of endpoint data that can be collected by an agent or sensor on the endpoint and sent to a central database for analysis by an information security monitoring system.

According to embodiments, the information security monitoring system can collect, e.g., through agents or sensors operating on various endpoints of a computer network, endpoint data containing IOCs, initiate scans to search IOCs across the computer network, integrate information from third-party security tools or systems such as network security systems, intrusion detection systems, antivirus software, advanced persistent threat (APT) detection systems, and the like (which are collectively referred to herein as source systems or sources) for comprehensive IOC analyses, and perform remediate actions when appropriate.

Currently, security definitions used by such third-party source systems (e.g., intrusion detection systems, etc.) to describe IOCs do not have a single or universal standardized format. Instead, there are many standardized formats for

| Type | Value | Description |
|---|---|---|
| Hash (MD5) | 985FF936CC2313CFA5547576627A2F1C | creditApplication.doc |
| Hash (SHA1) | B08087898683B24536DB472EDF7CB09F9A9F464B | creditApplication.doc |
| Hash (MD5) | 40F5F347DEB70606027E4C8A14E2826E | downloader.txt |
| Hash (SHA1) | 808B5C85FA994DDAAF779ECD4CC035DDF0173EF6 | downloader.txt |
| Hash (MD5) | 8D57CEFA205EDCCB286BAEDFB62EE9F0 | 5923.dll |
| Hash (SHA1) | AF2A6A20226DFF49B1E8430D248C10DDA4EF26CD | 5923.dll |
| Domain | evil.ec2.cloudcompany.com | |
| IPv4 | 12.7.83.2 | Domain IP address |

Table 2 below lists examples of intermediate IOC atoms that may be found from attack flow 100.

| Type | Value | |
|---|---|---|
| Registry Key | HKLM\Software\Classes\*\ShellEx\PropertySheetHandlers\5923 | |
| File Path | C:\Users\*\AppData\Local\Temp\downloader.txt | |
| File Path | C:\Users\*\AppData\Local\Temp\5923.dll | |
| Network Connection | Local (127.0.0.1 : 4723) -> Remote (12.7.83.2 : 666) | |
| Company Name (PE Attributes) | Evil corp. | downloader.txt |
| Company Name (PE Attributes) | Steal Ur Data LLC | 5923.dll |

Table 3 below lists examples of advanced behaviors that may be found from attack flow 100.

representing IOC definitions (e.g., STIX™, OpenIOC, YARA), a couple of standardized formats for representing vulnerability information (e.g., OVAL®), and no standard format for representing behavior rules. Thus, each EDR system may use their own format. Further, there is not a standardized format for combining IOCs, behavioral rules, and vulnerability definitions in the same rule/definition.

Structured Threat Information Expression (STIX™) is a language and serialization format that is used to exchange cyber threat intelligence (CTI). Open IOC is an open framework with an extensible XML schema for describing the technical characteristics that identify a known threat, an attacker's methodology, or other evidence of compromise. YARA is a tool that takes a rule-based approach to create descriptions of malware families based on textual or binary patterns and that is primarily used in malware research and detection or identifying and classifying malware samples. A description in YARA is based on a textual or binary pattern. OVAL® refers to Open Vulnerability and Assessment Language and includes a language for encoding system details that can be used to determine vulnerability and configuration issues on computer systems. It is an information security community's effort to standardize how to assess and report on the machine state of computer systems and includes content repositories held throughout the information security community.

Because security definitions used by source systems do not currently have a standardized format, it is possible that different security definitions from different source systems are actually about the same security threat. For instance, it is possible that a STIX2 fie in the JSON format and an Open IOC file in the XML format from two sources, written by two different authors, are about the same malware. As a result, it is not possible for the information security monitoring system to import them from the source systems and use these security definitions "as is" directly without any modification. Further, security definitions imported into the information security monitoring system from source systems are not editable because they were created using proprietary tools such as editors that conform to different security standards.

To address these issues, the information security monitoring system disclosed herein is adapted to import third-party security definitions and provide a way for users to compose, edit, enhance, or otherwise adapt third-party security definitions to suit their network computing environment(s). An example of this process is illustrated in FIG. 2.

Figure 2:
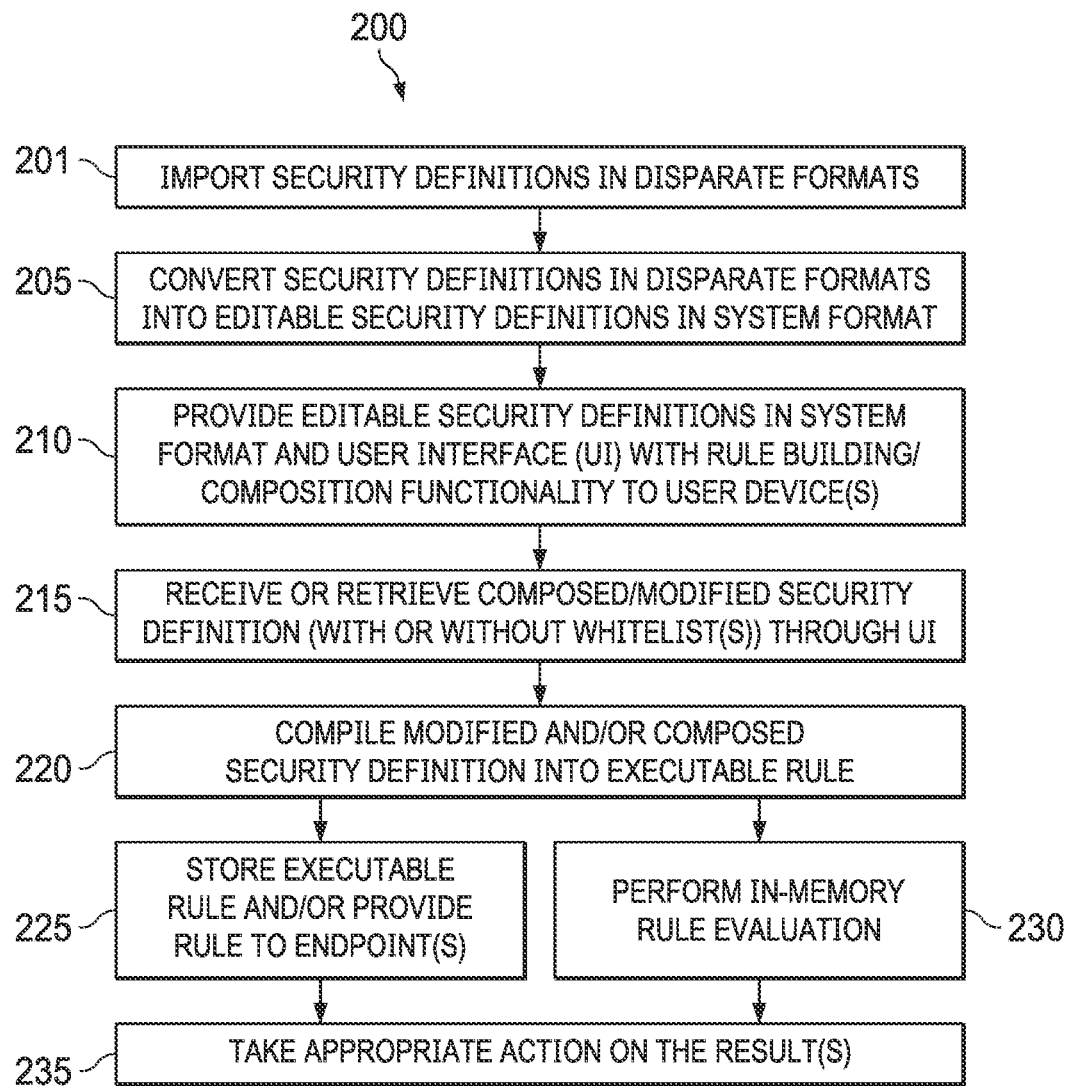
FIG. 2 is a flow chart illustrating an example of a method for information security monitoring with disparate IOCs according to some embodiments disclosed herein.

More specifically, FIG. 2 illustrates an example of a method 200 for information security monitoring with disparate IOCs from various source systems. In some embodiments, method 200 may include importing security definitions in disparate formats from a plurality of source systems (201).

In some embodiments, the security definitions in the disparate formats can comprise at least two of an endpoint behavioral rule in the JSON format, an IOC definition in the JSON format, an IOC definition in the XML format, a STIX 2 IOC definition in the JSON format, a STIX 1.2 IOC definition in the XML format, an OpenIOC IOC definition in the XML format, a YARA IOC definition, an IOC definition in a language and serialization format, a rule consisting of sets of strings and a Boolean expression, a vulnerability description in the XML format, or an OVAL vulnerability description.

In some embodiments, the method can further include converting the security definitions in the disparate formats into editable security definitions in a system format internal to the information security monitoring system (205). In some embodiments, the system format can follow the JavaScript Object Notation (JSON) format. In some embodiments, the system format may follow other formats.

In some embodiments, converting the security definitions in the disparate formats into the system format can include parsing the security definitions in the disparate formats to extract metadata fields and operators and mapping the metadata fields thus extracted to metadata fields of the editable security definitions in the system format in accordance with a master metadata schema. In some embodiments, the master metadata schema is based on a superset of STIXT™ 2.

In some embodiments, the method can further include providing the editable security definitions and a user interface to a user device (210). In some embodiments, the user device can be an endpoint of an enterprise network. The user interface, which is further described below, is particularly adapted for rule building/composition. As a non-limiting example, the user interface can be a user-friendly graphical user interface (GUI).

In some embodiments, the rule building/composition function leverages the system format to allow more complex security definitions to be composed through the user interface. For instance, a complex IOC definition can describe a process that runs with a particular name and that opens a particular connection, or a more detailed signature must have certain hashes, one of these particular IPs, one of these particular domains, etc. The system can import atomic IOC definitions as well as complex IOC definitions such as those that have deeply nested Boolean structures and/or that reference another IOC definition, a behavioral rule, or a vulnerability description. The system format can preserve such complexities, allowing a security definition in the system format to express the same nested Boolean structure(s) and/or reference(s).

That is, a Boolean structure from a source system/input format can be preserved. Some EDR systems allow for creating custom rules using nested Boolean structures. However, when importing an external IOC definition, only IOC atoms (e.g. hashes, IP addresses) come through and the original Boolean structure is lost. Embodiments disclosed herein can preserve both the underlying complex Boolean structure, while also mapping complex metadata and behaviors. For example, given a complex IOC definition that describes "a process name 'foo.exe' opens a network connection to remote IP 1.2.3.4 on port 91," a typical EDR system would extract only the IP address "1.2.3.4." This means that the Boolean structure, the behavior (which, in this example, is represented by the process named 'foo.exe' for performing certain action), and the advanced metadata (which, in this example, includes the remote port number) would be lost during the importation of the external IOC definition. By preserving the underlying complex Boolean structure, while also mapping complex metadata and behaviors, embodiments suffer very little "loss" of fidelity from the original source format.

With more details than atomic security definitions, complex security definitions can reduce false positives. Further, as described below, additional enhancement can also be applied through the rule building/composition functionality of the user interface. A user can study the behavior of a malware of interest and leverage the rule building/composition functionality to build a more robust IOC definition.

Whitelisting is another form of rule composition. Thus, in some embodiments, whitelists can also be created, composed, or modified through the user interface. A whitelist can be added to a composed or modified security definition in the system format to handle exceptions.

A composed or modified security definition in the system format can be received or retrieved from the user device (215). The composed or modified security definition in the system format can then be compiled into an executable rule (220).

In some embodiments, the method can further include storing the executable rule in a database and/or communicating the executable rule to another computing facility such as an EDR system or an agent or sensor running on an endpoint of an enterprise network (225). The agent or sensor can send a notification to the information security monitoring system in response to the endpoint having telemetry (which refers to a collection of measurements or other data at the endpoint that is remote from the information security monitoring system) meeting the executable rule (e.g., an IOC from the endpoint meets the IOC definition on which the executable rule is compiled). In response to the notification, the information security monitoring system can retrieve the telemetry from the endpoint and store the telemetry in a database for further analysis and/or investigation.

In some embodiments, the executable rule can be evaluated (e.g., by the information security monitoring system, by an endpoint, by an EDR system, etc.) to produce a result indicative of an endpoint security action needed in view of an IOC meeting the IOC definition on which the executable rule is compiled (230). Examples of endpoint security actions can include, but are not limited to, collecting a file, killing a process, deleting a file, uploading a file to a sandbox, etc. (235). In some embodiments, the method can include performing an in-memory evaluation of the executable rule without storing the executable rule in a data storage.

Figure 3:
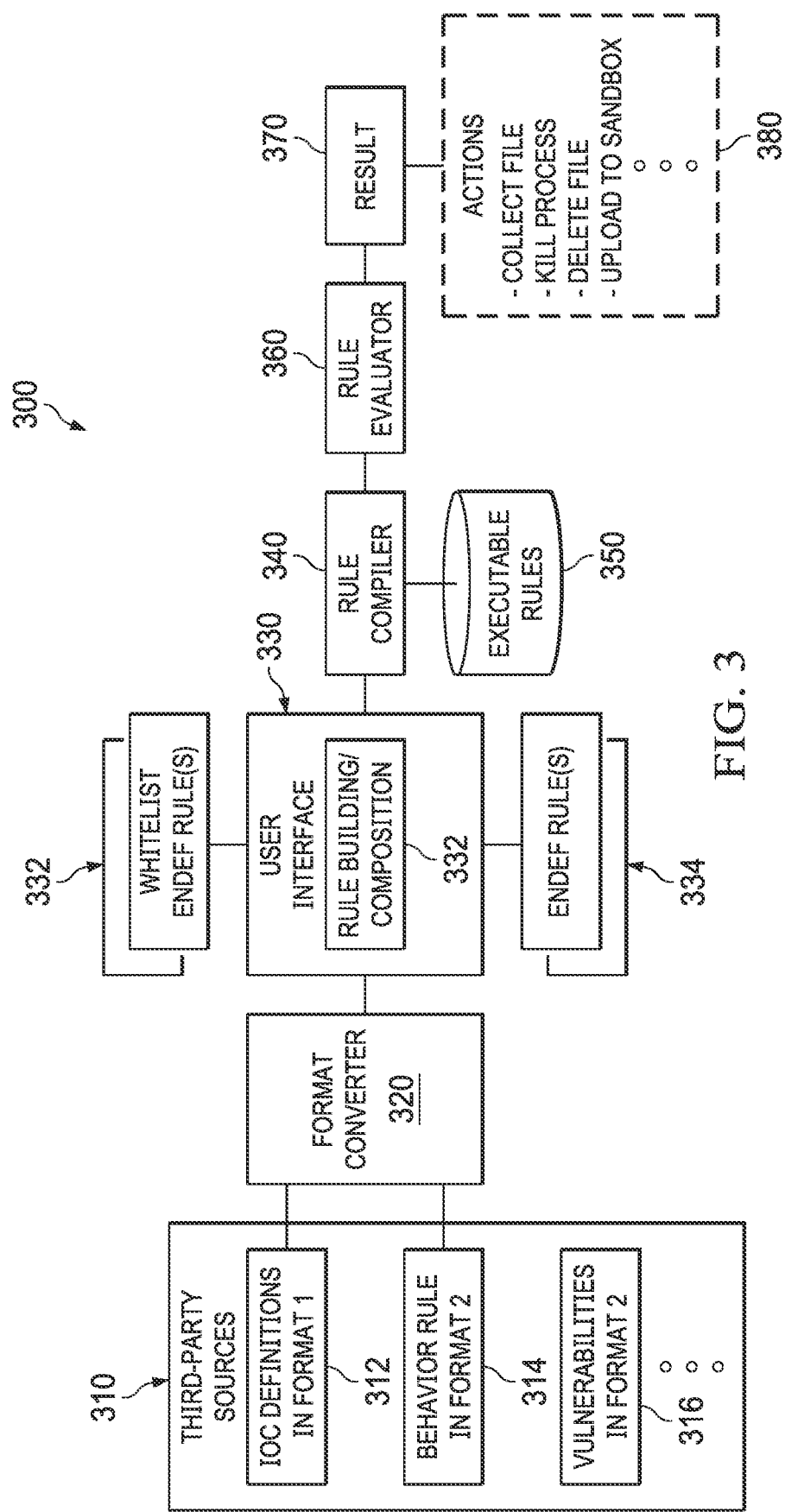
FIG. 3 depicts a diagrammatical representation of a system for information security monitoring with disparate IOCs according to some embodiments disclosed herein.

FIG. 3 depicts a diagrammatical representation of a system implementing an information security monitoring method described above, according to some embodiments disclosed herein. In the example of FIG. 3, system 300 can import security definitions 312, 314, 316 in disparate formats from third-party sources 310.

In embodiments disclosed herein, system 300 supports importation of various security definitions, including those that follow the standardized YARA language. FIGS. 4A-4B show examples of IOC definitions describing malware signatures, such as those used in attack flow 100, in the YARA language. Specifically, FIG. 4A is an example of a YARA rule describing a downloader binary signature, while FIG. 4B is an example of another YARA rule describing a shell extension binary signature.

System 300 can include an importer or format converter 320 that is adapted to convert the imported security definitions into a system format as described above. In some embodiments, format converter 320 can also convert security definitions in the system format into various formats that can then be exported to other systems, including one or more third-party sources 310.

In some embodiments, format converter 320 is adapted to parse an imported security definition to extract metadata fields and operators, map the metadata fields thus extracted to metadata fields described in a master metadata schema (e.g., one that is based on a superset of STIX™ 2), and generate an editable security definition in the system format. In some embodiments, the master metadata schema is based on a superset of STIX™ 2. Other implementations of the master metadata schema are also possible.

Figure 5B:
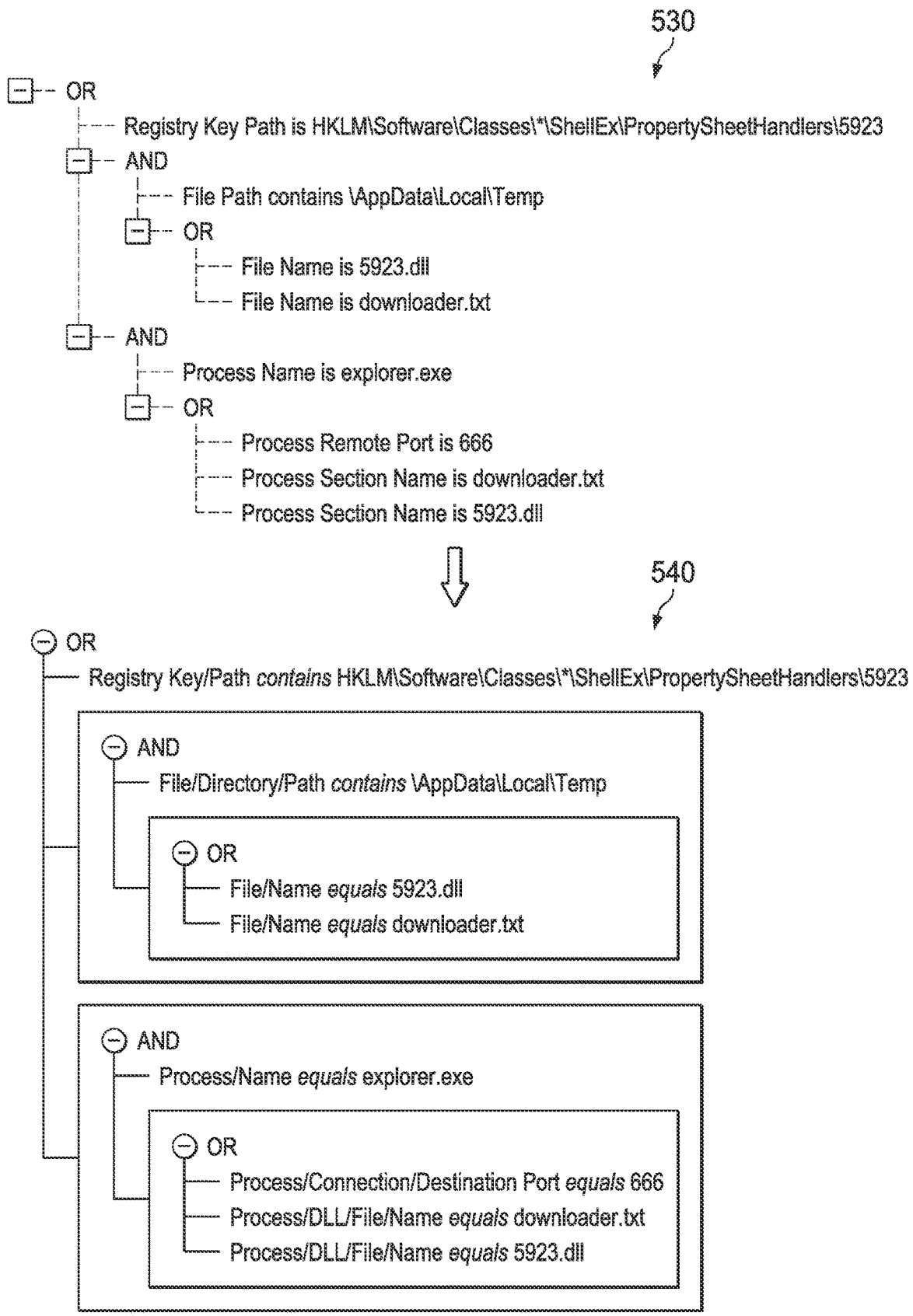

FIGS. 5A-5B are examples of how format converter 320 can map different security definitions in different formats (e.g., from attack flow 100) into a system format. In the example of FIG. 3, converted security definitions in the system format are referred to as endpoint definition (endef) rules 334.

More specifically, FIG. 5A shows a STIX 2 IOC definition 510 having a STIX pattern and an editable IOC definition 520 generated by format converted 320 from STIX 2 IOC definition 510. In this case, STIX 2 IOC definition 510 contains a watchlist for observing basic IOC atoms learned from attack flow 100. The editable IOC definition 520 contains the same watchlist but in a system format that is viewable and editable through user interface 330.

FIG. 5B shows an Open IOC definition 530 in an industry standard format called Open IOC XML 1.2 and an editable IOC definition 540 generated by format converted 320 from Open IOC definition 530. In this case, Open IOC definition 530 describes a browser behavior learned from attack flow 100 in a complex Boolean structure. The editable IOC definition 540 preserves the same complex Boolean structure but is in a system format that is viewable and editable through user interface 330.

In this example, source fields such as "Process Remote Port" are mapped to target fields described in a master metadata schema (e.g., "Process/Connection/Destination Port"). Additionally, source operators (e.g., "is") are mapped to target operators described in the master metadata schema (e.g., "equals"). In this way, a user can compose or edit a complex security definition having a nested Boolean structure and/or referencing another IOC definition, a behavioral rule, or a vulnerability description.

Figure 6:
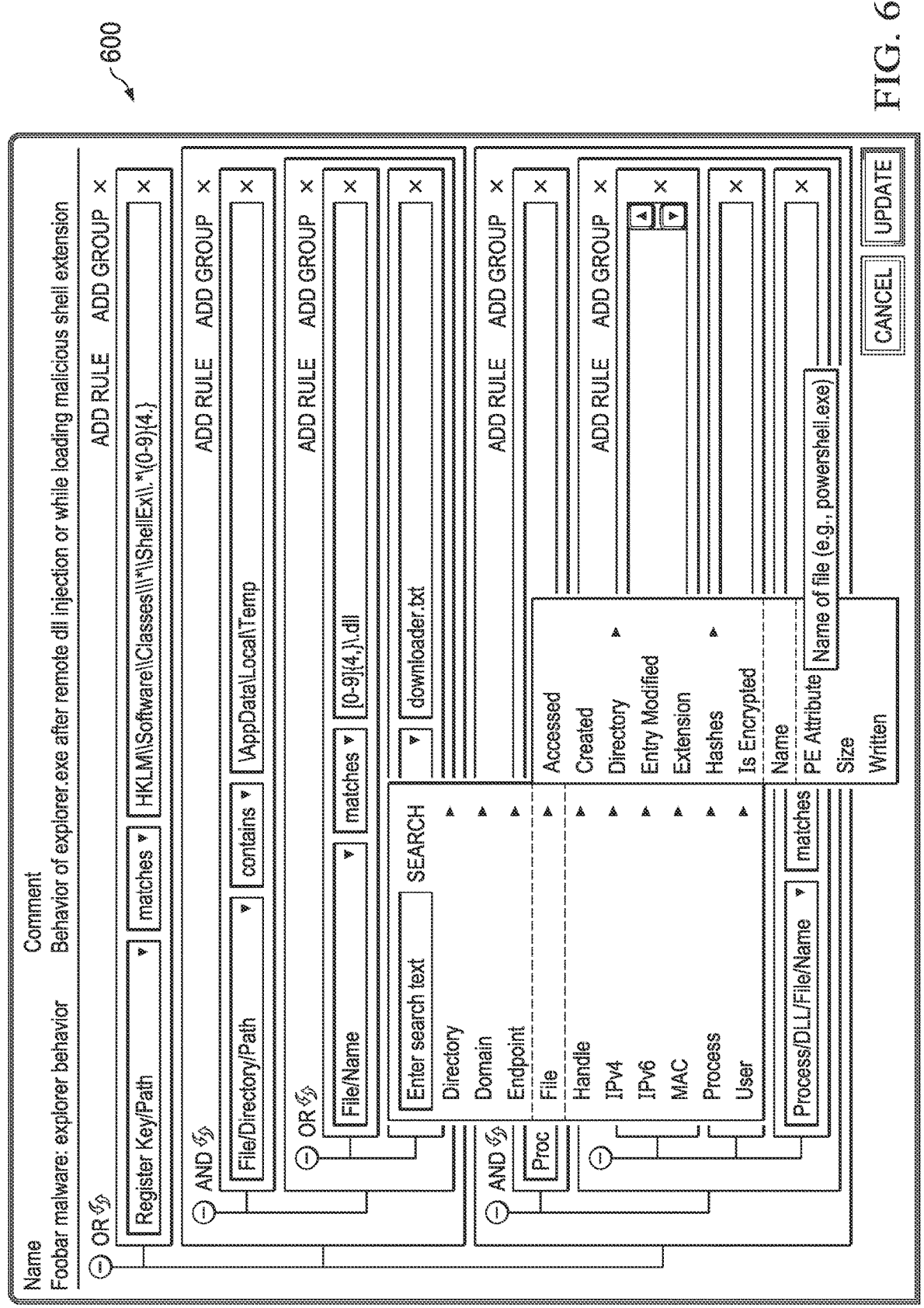
FIG. 6 depicts a diagrammatic representation of an example of a UI adapted for rule building and/or composition according to some embodiments disclosed herein.

In some embodiments, composition, modification, and/or enhancement of a security definition in the system format can be achieved through a rule building/composition functionality or tool 332 of user interface 330. As a non-limiting example, user interface 330 can be a user-friendly GUI. FIG. 6 depicts a diagrammatic representation of an example of a UI 600 adapted for rule building and/or composition according to some embodiments disclosed herein.

Figure 7:
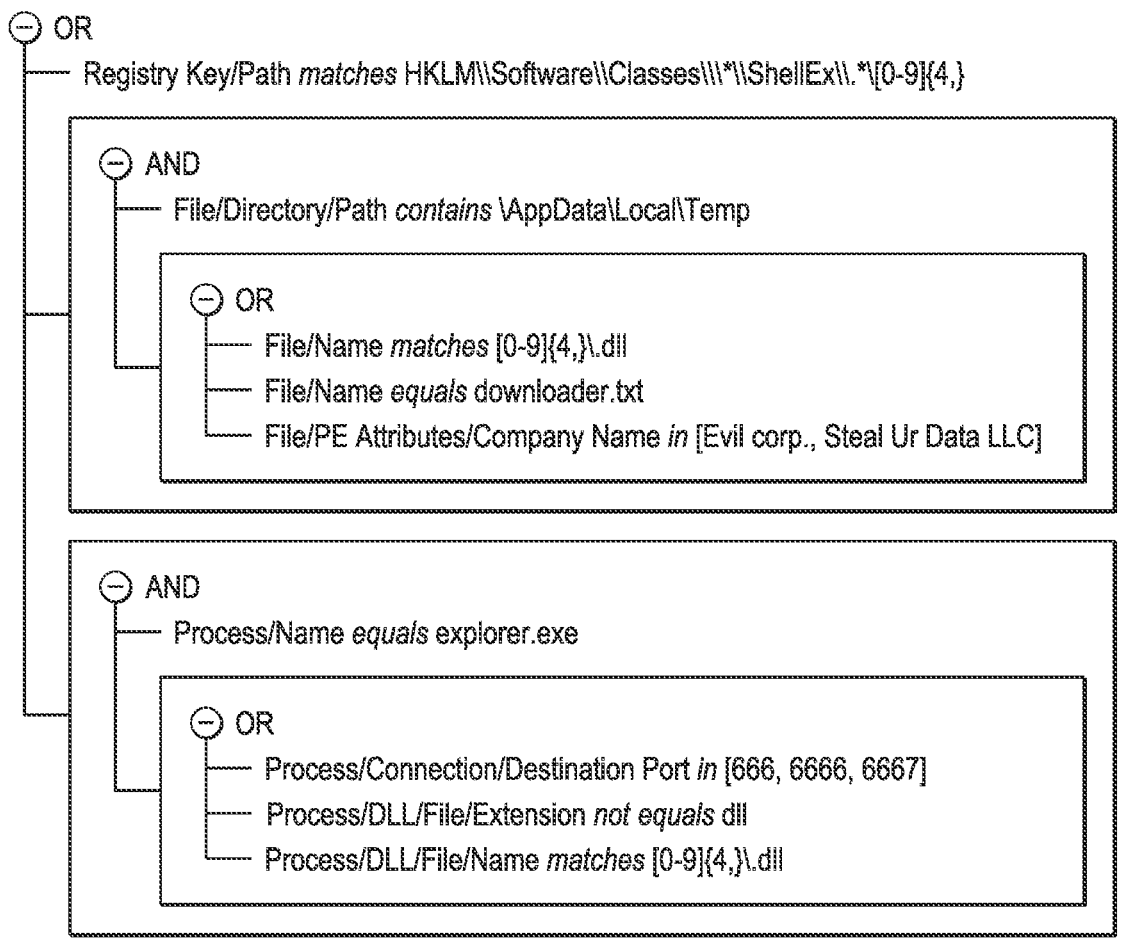
FIG. 7 shows examples of enhancements and/or modifications made to a security definition in an editable system format through the UI of FIG. 6 according to some embodiments disclosed herein.

FIG. 7 shows examples of enhancements and/or modifications that can be made, for instance, through user interface 330, to a security definition in an editable system format. The security definition is converted by format converter 320 from an imported security definition as discussed above. As illustrated in FIG. 7, several enhancements are made to the security definition, including using regular expressions to define a match pattern of random file names (e.g., Registry Key, File Name, Process/DLL), add a new term for "Company Name," define that "Process/DLL/File/Extension" does not equal "DLL," add destination ports to be observed (e.g., "666," "6666," "6667"), and so on.

Figure 8:
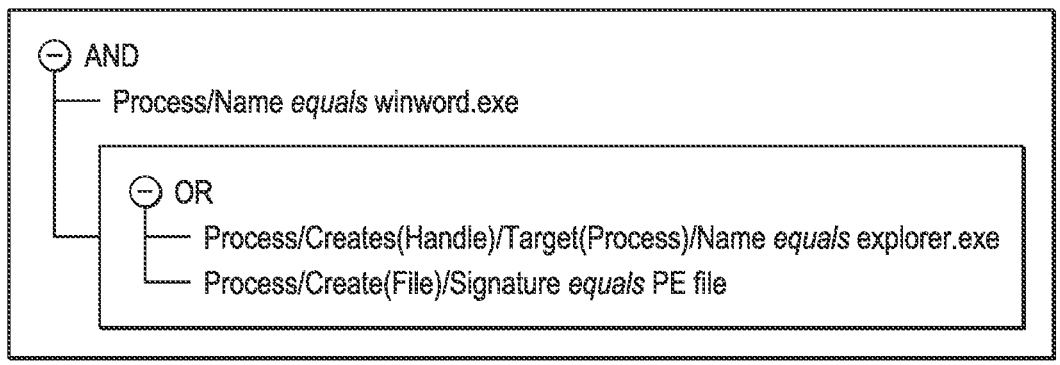
FIG. 8 shows an example of a security definition describing a behavior rule in an editable system format according to some embodiments disclosed herein.

FIG. 8 shows another example of a security definition composed using user interface 330. In this example, the security definition is a behavior rule that describes a malware (e.g., "winword") behavior.

Figure 9A:
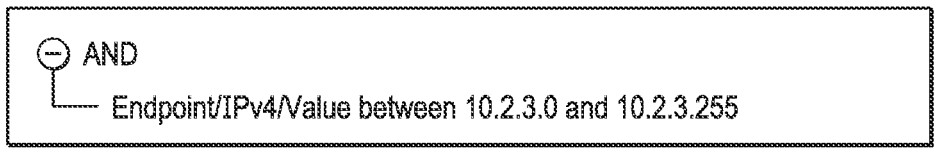
FIGS. 9A-9B are examples of whitelists created in an editable system format according to some embodiments disclosed herein.
Figure 9B:
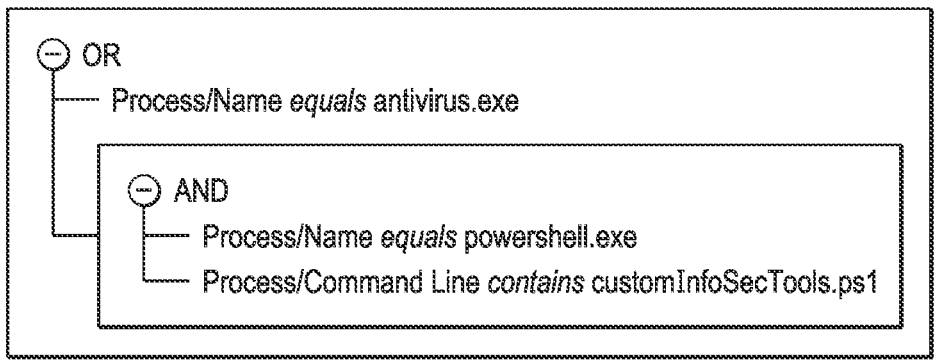

In some embodiments, whitelists (e.g., whitelist endef rules 332) can also be created, composed, or modified through user interface 330. FIGS. 9A-9B are examples of whitelists created in an editable system format according to some embodiments disclosed herein. FIG. 9A shows an example of a whitelist for excluding machines in an infrastructure such as sandboxes, virtual machines used by malware researchers, etc. FIG. 9B shows an example of a whitelist for excluding trusted security tools such as programs that are allowed to do "anomalous things." Examples of such trusted security tools can include deployed antivirus software, scripts maintained by the system, etc.

Figure 10:
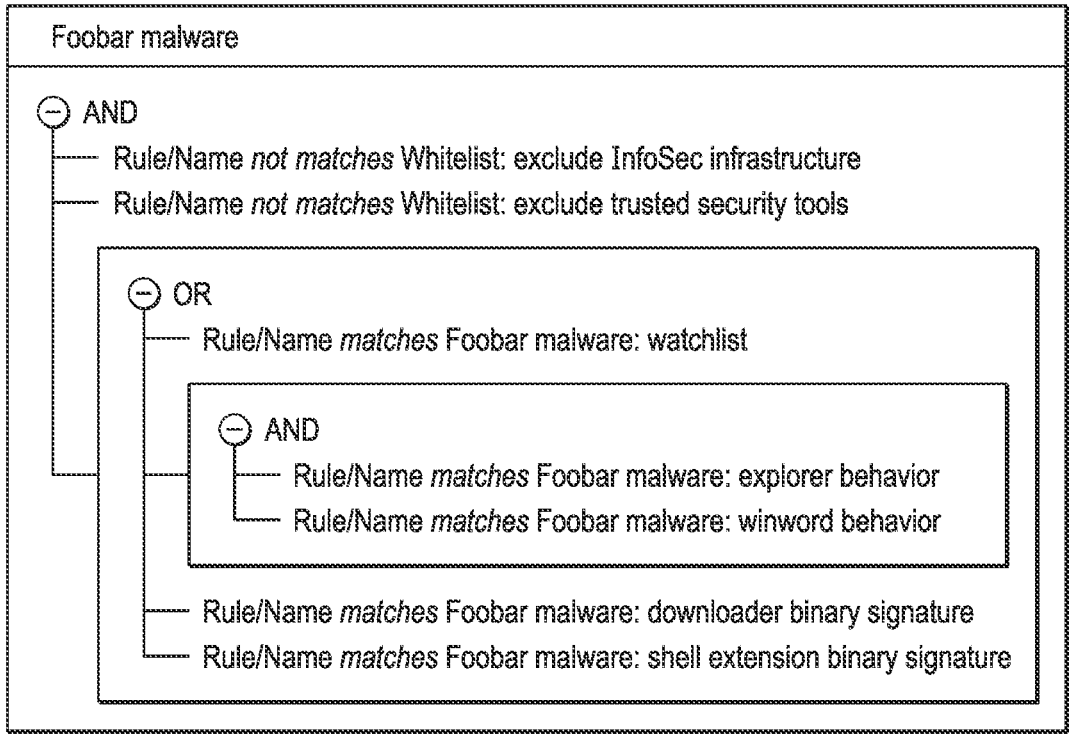
FIG. 10 shows an example of a security definition describing a composite rule in an editable system format according to some embodiments disclosed herein.

FIG. 10 shows yet another example of a security definition composed using user interface 330. In this example, the security definition is a composite rule that references multiple other rules. In this composite rule, certain endpoints and trusted processes are whitelisted. If a referenced rule is updated, the composite rule will be updated at evaluation time.

Referring to FIG. 3, in some embodiments, system 300 can further include a rule compiler 340 for compiling a composed security definition into an executable rule as discussed above. The executable rule can be stored in a data storage (e.g., database 350) or evaluated by a rule evaluator 360. In some embodiments, database 350 is adapted to support the structured query language (SQL). In some embodiments, database 350 is adapted for storing enterprise telemetry and/or endpoint telemetry.

Many implementations of rules evaluation are possible. For example, security data might be naturally modeled as graph data (e.g., with vertices and edges) and, therefore, to implement a security information and event management (SIEM) system, system 300 can be adapted to compile a rule to a query language that is supported by a graph database (e.g., a graph traversal language such as GREMLIN, a semantic search query language such as SPARQL, a graph query language such as CYPHER, etc.) or SIEM and compose a query that can be executed to get result sets and then apply actions. Further, in some cases, rules can be evaluated through endpoints directly on everyone's machines in an enterprise computer network. Agents on the endpoints are adapted to understand these rules, which were compiled to SQL and executed on the endpoint telemetry stored in a SQL database. In some cases, the rules can be evaluated based on all the telemetries that the system has received and stored globally (e.g., in an enterprise telemetry data storage) and the results can be stored in a report database. In some cases, a rule compiler can compile to both use cases. In some cases, it makes more sense to evaluate rules in memory. In some cases, the in-memory evaluation can be performed without having to store an executable rule.

In the example of FIG. 3, the evaluation of the executable rule produces an actionable result 370. Possible actions 380 can include collecting a file, killing a process, deleting a file, uploading a file to a sandbox, and so on. Other automated actions are also possible.

In some embodiments, all or part of the components of system 300 shown in FIG. 3 can be implemented on a detection engine operating on a server computer in an enterprise computing environment. Other implementations are also possible.

Figure 11:
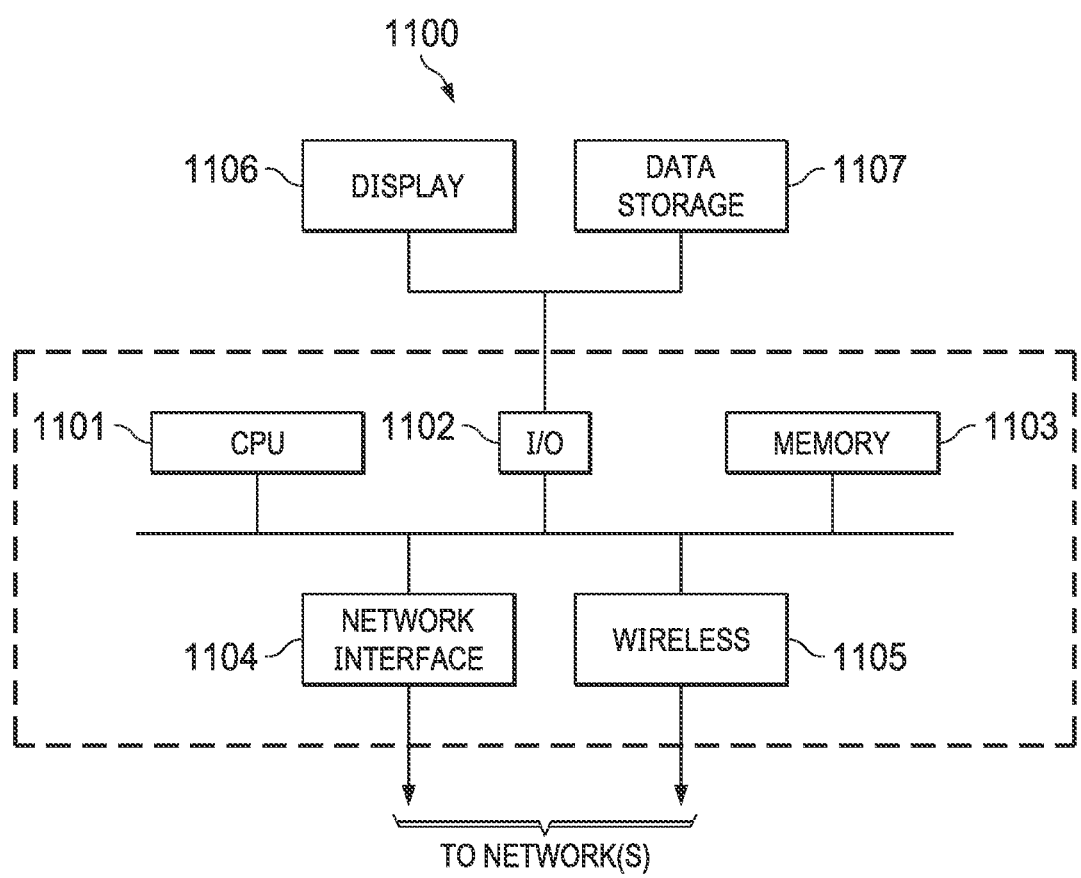
FIG. 11 depicts a diagrammatic representation of a data processing system for implementing a method for information security monitoring with third-party IOCs in disparate formats according to some embodiments disclosed herein.

FIG. 11 depicts a diagrammatic representation of a data processing system for implementing a method for information security monitoring with third-party IOCs in disparate formats according to some embodiments disclosed herein. As shown in FIG. 11, data processing system 1100 may include one or more central processing units (CPU) or processors 1101 coupled to one or more user input/output (I/O) devices 1102 and memory devices 1103. Examples of I/O devices 1102 may include, but are not limited to, keyboards, displays, monitors, touch screens, printers, electronic pointing devices such as mice, trackballs, styluses, touch pads, or the like. Examples of memory devices 1103 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1100 can be coupled to display 1106, information device 1107 and various peripheral devices (not shown), such as printers, plotters, speakers, etc. through I/O devices 1102. Data processing system 1100 may also be coupled to external computers or other devices through network interface 1104, wireless transceiver 1105, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for endpoint security monitoring, the method comprising:
providing, by a computer in an enterprise network, editable security definitions to a user device, the user device having a user interface adapted for composing, modifying, or enhancing the editable security definitions, wherein the editable security definitions having same format are converted from security definitions in disparate formats, wherein the security definitions include an indicator of compromise (IOC) definition, wherein an IOC refers to an artifact or a piece of data that can serve as forensic evidence of an unusual activity on the enterprise network, and wherein the IOC definition comprises a Boolean structure or references another IOC definition, a behavior rule, or a vulnerability description;

receiving or retrieving, by the computer from the user device, a composed or modified security definition, wherein the composed or modified security definition preserves the Boolean structure or the reference to another IOC definition, to the behavioral rule, or to the vulnerability description; and compiling, by the computer, the composed or modified security definition into an executable rule, wherein the executable rule is executable by the computer or an endpoint of the enterprise network to produce a result indicative of an endpoint security action needed in view of an endpoint event that meets the composed or modified security definition.

2. The method according to claim 1, further comprising: importing the security definitions in the disparate formats from a plurality of source systems, the importing comprising preserving the Boolean structure or the reference to another IOC definition, behavior rule, or vulnerability description.

3. The method according to claim 1, further comprising: storing the executable rule in a database on the enterprise network; or communicating the executable rule to a computing facility, an endpoint detection and response system, or an agent or sensor running on an endpoint of the enterprise network.

4. The method according to claim 1, further comprising: storing the executable rule in a database on the enterprise network; and communicating the executable rule to a computing facility, an endpoint detection and response system, or an agent or sensor running on an endpoint of the enterprise network.

5. The method according to claim 1, wherein the 10C definition describes a process that runs with a particular name and that opens a connection.

6. The method according to claim 1, wherein the editable security definitions have a lightweight data-interchange format.

7. The method according to claim 1, wherein the security definitions in the disparate formats conform to different security standards.

8. A system for endpoint security monitoring, the system comprising:
a processor;
a non-transitory computer-readable medium; and
instructions stored on the non-transitory computer-readable medium and translatable by the processor for:
providing editable security definitions to a user device, the user device having a user interface adapted for composing, modifying, or enhancing the editable security definitions, wherein the editable security definitions having same format are converted from security definitions in disparate formats, wherein the security definitions include an indicator of compromise (IOC) definition, wherein an IOC refers to an artifact or a piece of data that can serve as forensic evidence of an unusual activity on an enterprise network, and wherein the IOC definition comprises a Boolean structure or references another IOC definition, a behavior rule, or a vulnerability description;

receiving or retrieving, by the computer from the user device, a composed or modified security definition, wherein the composed or modified security definition preserves the Boolean structure or the reference to another IOC definition, to the behavioral rule, or to the vulnerability description; and compiling, by the computer, the composed or modified security definition into an executable rule, wherein the executable rule is executable by the computer or an endpoint of the enterprise network to produce a result indicative of an endpoint security action needed in view of an endpoint event that meets the composed or modified security definition.

9. The system of claim 8, wherein the instructions are further translatable by the processor for:
importing the security definitions in the disparate formats from a plurality of source systems, the importing comprising preserving the Boolean structure or the reference to another IOC definition, behavior rule, or vulnerability description.

10. The system of claim 8, wherein the instructions are further translatable by the processor for:
storing the executable rule in a database on the enterprise network; or
communicating the executable rule to a computing facility, an endpoint detection and response system, or an agent or sensor running on an endpoint of the enterprise network.

11. The system of claim 8, wherein the instructions are further translatable by the processor for:
storing the executable rule in a database on the enterprise network; and
communicating the executable rule to a computing facility, an endpoint detection and response system, or an agent or sensor running on an endpoint of the enterprise network.

12. The system of claim 8, wherein the IOC definition describes a process that runs with a particular name and that opens a connection.

13. The system of claim 8, wherein the editable security definitions have a lightweight data-interchange format.

14. The system of claim 8, wherein the security definitions in the disparate formats conform to different security standards.

15. A computer program product comprising a non-transitory computer-readable medium storing instructions translatable by a processor for:
providing editable security definitions to a user device, the user device having a user interface adapted for composing, modifying, or enhancing the editable security definitions, wherein the editable security definitions having same format are converted from security definitions in disparate formats, wherein the security definitions include an indicator of compromise (IOC) definition, wherein an IOC refers to an artifact or a piece of data that can serve as forensic evidence of an unusual activity on an enterprise network, and wherein the IOC definition comprises a Boolean structure or references another IOC definition, a behavior rule, or a vulnerability description;

receiving or retrieving, by the computer from the user device, a composed or modified security definition, wherein the composed or modified security definition preserves the Boolean structure or the reference to another IOC definition, to the behavioral rule, or to the vulnerability description; and compiling, by the computer, the composed or modified security definition into an executable rule, wherein the executable rule is executable by the computer or an endpoint of the enterprise network to produce a result indicative of an endpoint security action needed in view of an endpoint event that meets the composed or modified security definition.

16. The computer program product of claim 15, wherein the instructions are further translatable by the processor for:
    importing the security definitions in the disparate formats from a plurality of source systems, the importing comprising preserving the Boolean structure or the reference to another IOC definition, behavior rule, or vulnerability description.

17. The computer program product of claim 15, wherein the instructions are further translatable by the processor for:
    storing the executable rule in a database on the enterprise network; or
    communicating the executable rule to a computing facility, an endpoint detection and response system, or an agent or sensor running on an endpoint of the enterprise network.

18. The computer program product of claim 15, wherein the instructions are further translatable by the processor for:
    storing the executable rule in a database on the enterprise network; and
    communicating the executable rule to a computing facility, an endpoint detection and response system, or an agent or sensor running on an endpoint of the enterprise network.

19. The computer program product of claim 15, wherein the IOC definition describes a process that runs with a particular name and that opens a connection.

20. The computer program product of claim 15, wherein the editable security definitions have a lightweight data-interchange format and wherein the security definitions in the disparate formats conform to different security standards.

* * * * *